United States Patent
Gouff et al.

(10) Patent No.: US 7,434,352 B2
(45) Date of Patent: Oct. 14, 2008

(54) RODENT BAIT DISPENSER

(76) Inventors: Rodney E. Gouff, 4400-C Portola Rd., Atascadero, CA (US) 93422; Kenneth L. Gouff, 4400-C Portola Rd., Atascadero, CA (US) 93422; Jana L. Larsen, P.O. Box 290, Atascadero, CA (US) 93423

( * ) Notice: Subject to any disclaimer, the term of this patent is extended or adjusted under 35 U.S.C. 154(b) by 39 days.

(21) Appl. No.: 11/198,131

(22) Filed: Aug. 8, 2005

(65) Prior Publication Data

US 2006/0090392 A1    May 4, 2006

Related U.S. Application Data

(60) Provisional application No. 60/623,180, filed on Oct. 29, 2004.

(51) Int. Cl.
*A01M 25/00* (2006.01)
(52) U.S. Cl. ........................................ 43/124
(58) Field of Classification Search .................. 43/124; 111/7.1, 7.2, 7.3, 7.4, 95; 172/371, 374, 172/375, 378; 222/341, 362, 5; 221/268, 221/269, 270, 271, 2; 294/26.5, 148
See application file for complete search history.

(56) References Cited

U.S. PATENT DOCUMENTS

| | | | | |
|---|---|---|---|---|
| 182,385 A * | 9/1876 | Randolph | .................... | 222/559 |
| 558,448 A * | 4/1896 | Brown | .................... | 222/336 |
| 568,150 A * | 9/1896 | Williams | .................... | 222/309 |
| 797,531 A * | 8/1905 | Peters | .................... | 111/7.1 |
| 839,810 A * | 1/1907 | Camerson | .................... | 111/7.2 |
| 919,017 A * | 4/1909 | Jackson | .................... | 111/7.3 |
| 951,760 A * | 3/1910 | Foulke | .................... | 111/7.4 |
| 1,258,551 A * | 3/1918 | Fleming | .................... | 111/7.2 |
| 1,452,110 A * | 4/1923 | Demascus | .................... | 111/7.1 |
| 1,540,660 A * | 6/1925 | Snow | .................... | 43/124 |
| 1,558,426 A | 10/1925 | Barnes | | |
| 1,573,670 A | 2/1926 | Barnes | | |
| 1,624,033 A * | 4/1927 | Dean | .................... | 111/7.2 |
| 1,646,767 A * | 10/1927 | Andreas | .................... | 43/124 |
| 1,756,582 A * | 4/1930 | Butler | .................... | 239/271 |
| 1,801,253 A * | 4/1931 | Amato | .................... | 43/124 |
| 1,856,809 A * | 5/1932 | Gibson | .................... | 111/92 |
| 1,990,262 A * | 2/1935 | Amity | .................... | 222/514 |
| 2,539,271 A * | 1/1951 | Rianda | .................... | 111/99 |
| 2,783,581 A * | 3/1957 | Lee | .................... | 43/124 |
| 2,914,820 A * | 12/1959 | Peterson | .................... | 422/243 |
| 3,550,542 A * | 12/1970 | Hollis | .................... | 111/95 |
| 4,413,440 A * | 11/1983 | Schultz | .................... | 43/124 |
| 4,624,194 A * | 11/1986 | Zinck | .................... | 111/7.2 |
| 5,193,721 A * | 3/1993 | Gryder | .................... | 222/341 |
| D445,162 S | 7/2001 | Gouff et al. | | |
| 7,096,622 B2 * | 8/2006 | James et al. | .................... | 43/124 |

\* cited by examiner

*Primary Examiner*—Kurt Rowan
(74) *Attorney, Agent, or Firm*—John P. O'Banion (57) ABSTRACT

A rodent bait dispenser that has a dispenser assembly and an activator mechanism. The dispenser assembly includes a generally cylindrical bait dispensing head with a piston assembly slidably disposed therein. The piston assembly includes a pair of spaced apart piston members coupled by a central rod, with the first piston member serving as a bait moving piston and the second piston member acting as an end cap for the cylinder head. The activator mechanism has a handle assembly and an actuating wire generally enclosed by a flexible sleeve. The actuating wire is coupled to the piston assembly for controlling extension and retraction of the piston assembly in relation to the cylinder head.

18 Claims, 10 Drawing Sheets

RODENT BAIT DISPENSER

CROSS-REFERENCE TO RELATED APPLICATIONS

This application is entitled to and hereby claims the priority of U.S. Provisional application, Ser. No. 60/623,180 filed Oct. 29, 2004, incorporated herein by reference in its entirety.

BACKGROUND OF THE INVENTION

1. Field of the Invention

The present invention pertains generally to rodent bait dispensing devices and, more particularly, to a mechanically operated device that can be operated with one hand and which allows placement of rodent bait in a desired location especially in a hole or burrow.

2. Description of the Related Art

Rodents often frequent areas which are not generally accessible to bait placement. For example, a gopher is typically an underground rodent having access to the surface through a hole or run. Placement of bait into the hole in an area where the gopher will find and consume the bait is often a difficult task.

One suggested means for applying gopher bait that is found on bait container labels is a household tablespoon. This method is unsatisfactory for several reasons. First, the bait may be easily spilled, making it available to children, pets, birds and other non-target animals. Second, the spilled bait will also have a tendency to sprout and grow. Third, the gopher is wary and, even if the bait is placed in the hole, if it is too near the surface the gopher will often push the bait out of the hole, engendering the previous two problems. Finally, if the gopher ingests the bait too near the surface and dies there, the poisonous carcass is readily accessible to other animals.

Devices have been proposed to assist with the dispensing of rodent bait, but these devices do not address all of the needs of the user. For example, U.S. Pat. Nos. 1,558,426 and 1,573,670 describe devices that are controlled by wires to allow placement of bait in a hole. However, these devices cannot penetrate very far into the hole before they bind and are unable to function. U.S. Pat. No. D445,162 shows another device which allows placement of bait into a hole but which requires two hands for operation and relies on gravity or motion to expel its contents. The shaft also limits the distance that the device can penetrate into the hole.

Therefore a need exists for a device that may be used to dispense rodent bait safely within an underground hole or burrow to a sufficient depth, which is simple to operate and which can be easy and cost effective to manufacture.

SUMMARY OF THE INVENTION

The foregoing deficiencies in existing devices are addressed by the present invention which allows rodent bait to be mechanically dispensed into a remote location with one-handed operation and which does not rely upon gravity feed.

In accordance with an aspect of the present invention, a rodent bait dispenser has a dispenser assembly and an activator mechanism. In one embodiment, the dispenser assembly includes a generally cylindrical bait dispensing head that is closed on one end to define a bait chamber, and open on the opposite end. Slidably disposed within the cylinder head is a piston assembly having first and second spaced apart piston members coupled by a central rod, the first piston member serving as a plunger and the second piston member acting as an end cap for closing the open end of the cylinder head.

In one mode of operation, the piston assembly has a first position in which the pair of piston members are retracted into the head, the second piston member keeping the bait within the bait chamber between the plunger and the end cap, and a second position in which the piston assembly is extended from the cylinder head with the plunger moving the bait out of the bait chamber. This retraction and extension of the piston assembly is controlled by the activator mechanism which includes a handle and a flexible cable that is coupled to the piston assembly. Activation of the handle serves to effect movement via the cable of the piston assembly from the first position to the second position, while spring bias within the handle returns the piston assembly to the first position upon release of the handle. The handle can be activated with one hand, with the corresponding movement of the plunger enabling the bait to be dispensed without the need for gravity or movement of the cylinder head.

According to another aspect of the invention, a rodent bait dispenser comprises an activator assembly, and a dispenser means coupled to said activator assembly for retaining rodent bait and dispensing rodent bait in response to operation of said activator assembly. In one embodiment, the dispenser means comprises a generally cylindrical bait dispensing head with a piston assembly slidably disposed therein to define a bait chamber in the bait dispensing head. In this embodiment, the piston assembly includes a pair of piston members fixedly spaced with respect to each other, wherein a first piston member of the pair acts as an end cap for the bait dispensing head and a second piston member of said pair serving as a bait moving piston. In another embodiment, the dispenser means comprises a bait dispensing head and a piston assembly slidably disposed in the bait dispensing head. In one embodiment, the piston assembly comprises first and second spaced apart piston members. In one embodiment, the first piston member comprises a plunger and the second piston member comprises an end cap. In one mode of operation, in a first position the piston assembly is retracted in relation to the bait dispensing head to retain bait in the bait dispensing head between the plunger and the end cap, and in a second position the piston assembly is extended from the bait dispensing head for dispensing bait by movement of the plunger. In one embodiment, the activator assembly comprises a handle and a wire generally enclosed by a flexible sleeve, wherein the wire is coupled to the piston assembly for controlling extension and retraction of the piston assembly in relation to the bait dispensing head.

It is, therefore, one object of the present invention to overcome the difficulties of placing rodent bait into a hole at a depth sufficient that the rodent will find and consume the bait.

Another object of the present invention is to provide a rodent bait dispenser that, when activated to release a portion of bait held within a container head, does not require gravity to dispense the bait portion from the container head.

A further object of the present invention is to provide a rodent bait dispenser having a container head with an inner plunger such that, when the plunger is activated to release bait held within the container head, no movement of the container head is required to dispense the bait therefrom.

Yet another object of the present invention is to provide a rodent bait dispenser having a container head supported on a flexible cable that can be inserted within a rodent burrow to a considerable depth while accommodating bends and irregularities in the burrow.

A still further object of the present invention is to provide a rodent bait dispenser having a container head with bait therein coupled to a handle by a flexible wire, the handle being designed such that activation to dispense the bait held within the container head can be effected by the operator using only one hand.

Yet another object of the present invention to provide a rodent bait dispenser that is not complex in structure and which can be manufactured at low cost but yet effectively place bait deeply within an underground rodent burrow so that the bait, as well as the consuming gopher, is out of the reach of children, pets, birds and surface animals.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figures 1, 3:
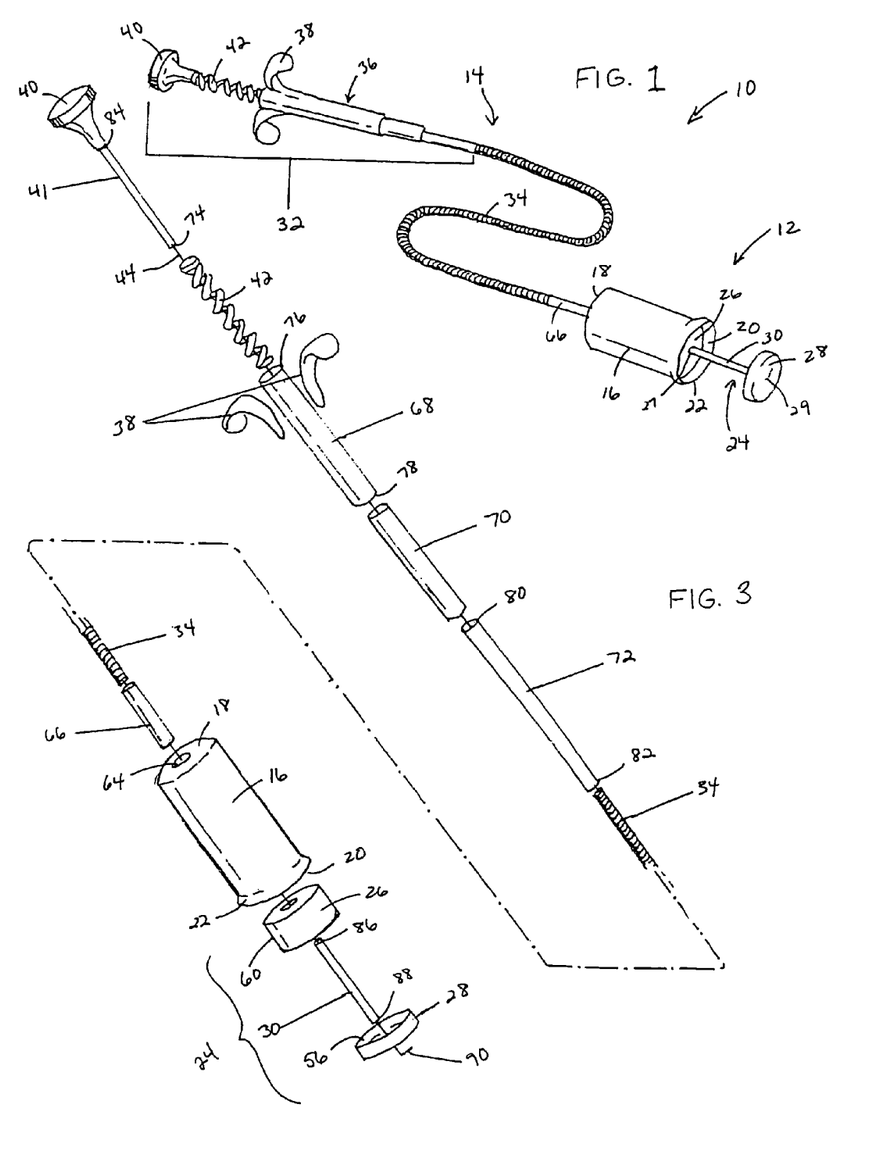
FIG. 1 shows a rodent bait dispenser including an activator mechanism and a dispenser assembly in accordance with the present invention.
FIG. 3 is an exploded perspective view of the components of the -rodent bait dispenser of FIG. 1.

As shown in FIG. 1, the present invention is a rodent bait dispenser generally designated by the reference numeral 10, having a dispenser assembly generally designated by the reference numeral 12, and an activator mechanism generally designated by the reference numeral 14.

The dispenser assembly 12 includes a bait dispensing cylinder head 16 that is generally cylindrical with a substantially closed end 18 and an open end 20 with a flared edge 22. Slidably disposed in the cylinder head 16 for movement through the open end 20 is a piston assembly 24 that includes a pair of generally parallel, spaced piston members, namely a bait moving piston member 26 and an end cap piston member 28, joined by a central rod 30 that passes through a hole 27 in the plunger and a hole 29 in the end cap.

The activator mechanism 14 includes a handle assembly 32 and a flexible sleeve 34 that is coupled to the piston assembly 24. The sleeve may be embodied as a metal cable housing, a flexible tubing member, or any other suitable member. The handle assembly 32 includes a housing portion 36 provided with two finger tabs 38, a control knob 40 with stem 41, and a spring 42. The control knob 40 can be moved toward the finger tabs 38 against the bias of spring 42 as secured within the housing portion 36. A wire 44 (shown in FIG. 3) is housed within the sleeve 34, providing the link for activation of the piston assembly 24 in conjunction with the handle assembly 32.

Figure 2A:
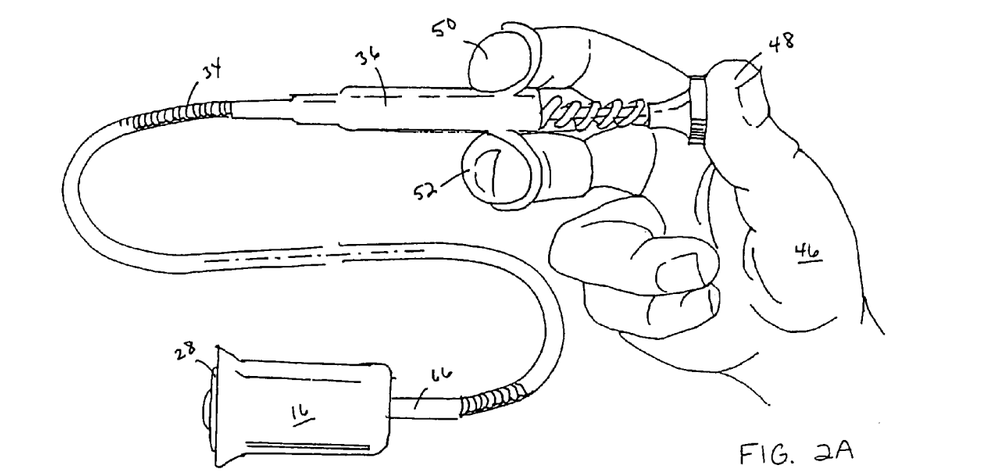
FIG. 2A depicts the rodent bait dispenser of FIG. 1, as held by a user prior to activation.
Figure 2B:
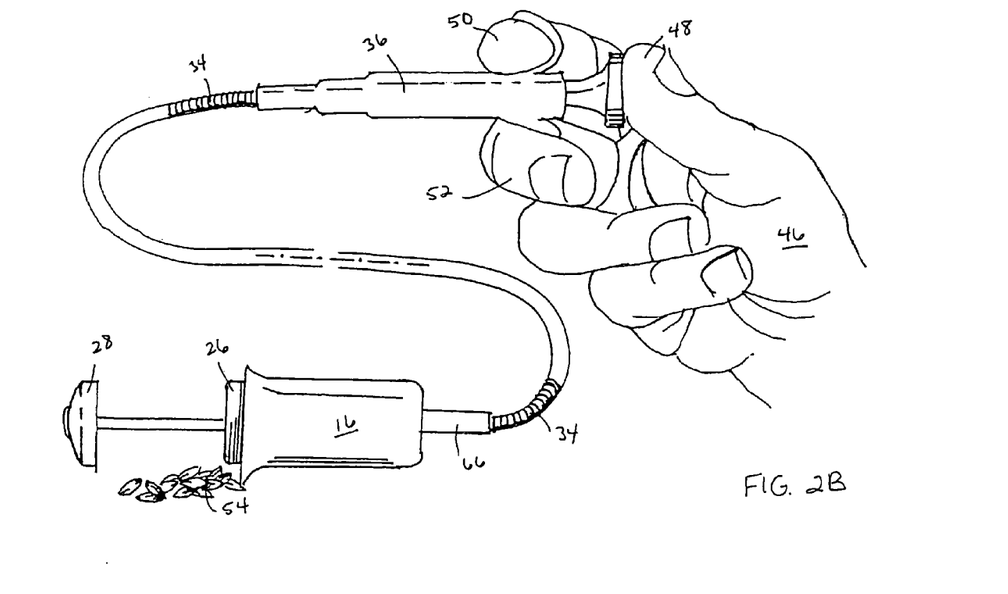
FIG. 2B depicts the rodent bait dispenser of FIG. 2A, following activation by the user.

As depicted in FIGS. 2A and 2B, the piston assembly 24 has two positions. In the first position, shown in FIG. 2A, the piston assembly 24 is retracted into the cylinder head 16 so that bait contained within the dispenser assembly 12 is retained in the cylinder head 16 between the end cap 28 and the bait moving piston 26. This retracted position is the "at rest" position due to partial loading existing on the spring 42. The user's hand 46, with the thumb 48 against the control knob 40 and the forefinger 50 and index finger 52 curved around the finger tabs 38, is shown prior to the exertion of any squeezing or gripping force on the handle assembly 32.

Movement of the piston assembly 24 to the second position in which the piston assembly is extended is shown in FIG. 2B. Gripping or squeezing force applied by the user's thumb 48 against the fingers 50 and 52 as secured under the tabs 38 results in protrusion or extension of the piston assembly 24 from the cylinder head 16. As the end cap 28 and the bait moving piston 26 move outwardly through connection with the rod 30, the piston 26 moves the bait 54 out of the cylinder head. When pressure on the control knob 40 is released, the spring 42 biases the piston assembly 24 back to the retracted position of FIG. 2A.

As shown in more detail in the exploded view of FIG. 3, the cylinder head 16 is generally a round cylinder which can be made of various rigid materials including metal or plastic, preferably transparent plastic. The cylinder head 16 is approximately one inch in diameter and approximately 2 inches in length, and is designed to hold a suitable quantity of bait. While the round cylindrical shape is preferred, other shapes could also be used effectively.

Fitted within the cylinder head 16 is the piston assembly 24 which includes the bait moving piston 26 and the end cap 28. According to the embodiment shown, the end cap 28 is a solid disc cupped on the edges 56 facing inward and is separated from, but connected to, the plunger 26 by the central rod 30. The rod 30, which may be provided with small ridges, is generally about two inches in length, spacing the end cap 28 and the bait moving piston 26 at opposite ends of the cylinder head 16. The resulting double-ended piston assembly 24 creates a bait chamber 58 (see FIG. 5) between the two piston members 26, 28, with the length of the piston assembly generally being somewhat shorter than the length of the cylinder head 16.

The outer diameter 60 of the bait moving piston 26 and end cap 28 piston members is slightly smaller than the inner diameter 62 of the cylinder head 16, allowing for free movement of the bait moving piston 26 and end cap 28 in and out of the cylinder head 16. The flared edge 22 of the open end 20 of the cylinder head opening into a bell shape helps to guide the retracting piston assembly 24 back into the cylinder head 16 following extension thereof. The nearness of the outer diameter 60 of the bait moving piston and end cap to that of the inner diameter 62 of the cylinder head, however, enables the end cap 28 to effectively capture, hold and protect the bait 54 within the chamber 58. Similarly, when the bait is to be dispensed, the closely-fitting diameter of the bait moving piston 26 within the cylinder head 16 ensures that when the handle assembly 32 is activated the bait contents are moved forward and forced out of the container, regardless of the orientation of the cylinder head 16, i.e., without the need for gravity.

The closed end 18 of the cylinder head 16 includes a small aperture or hole 64 in the center thereof. The inner diameter of this hole 64 is about 0.25 inches. A short cylinder head tube 66 is attached over the hole 64 on the outside of the cylinder 16. This tube 66 contains and secures the end of the cable housing or sleeve 34. The sleeve 34 is hollow and flexible and houses the wire 44 which extends through the hole 64 in the closed end 18 of the cylinder head 16 and is connected to the piston assembly 24. The sleeve is also substantially non-compressible in the axial direction.

The handle assembly 32 is attached to the cylinder head 16 by the sleeve 34 and wire 44. The sleeve 34 and wire 44 can vary in length according to the desired depth of the dispenser assembly 12 to be obtained into the rodent burrow. The flexibility of the sleeve enables the dispenser assembly 12 to twist, move and curve, unlike stiff wires or other rigid connectors such as were known and used in the prior art.

According to the embodiment shown, the housing portion 36 of the handle assembly 32 is made up of three ridged hollow tubes of different lengths and diameters, namely an outer tube 68, a middle tube 70 and an inner tube 72. The control knob 40 is about one inch across, while the control knob stem 41 has an outer diameter of about 0.1875 inches ($3/16$") and a length of about 2.625 inches ($2 5/8$"). The wire 44 is attached to the end 74 of the stem 41 and has an outer diameter of about 0.0625 inches ($1/16$") and a length of about 34.5 inches.

According to one preferred embodiment, the outer tube 68 has an inner diameter of 0.375 inches and is about 2.5 inches in length. The two finger tabs 38 are attached near one end 76 of the outer tube 68 on each side thereof. These arched finger tabs or supports are about 0.625 inches ($5/8$") wide, and about two inches long.

The middle tube 70 has an outer diameter of 0.375 inches ($3/8$") and an inner diameter of 0.25 inches ($1/4$"), and is about 1.75 inches ($1 3/4$") in length. The middle tube 70 slides inside the outer tube 68, at the opposite end 78 of the finger tabs 38 and is attached so that approximately 0.5 inches ($1/2$") of the middle tube extend out of the outer tube 68.

The inner tube 72 has an outer diameter of about 0.25 inches, an inner diameter of about 0.1875 inches ($3/16$"), and a length of about 4 inches. The inner tube 72 slides inside of the middle tube 70 and is attached with one end 80 even with the end 76 of the outer tube 68 where the finger tabs 38 are attached. The other end 82 of the inner tube 72 extends approximately 1 inch out of the middle tube 70.

The flexible sleeve 34 fits into the inner tube 72 approximately 1 inch and is attached, such as by soldering. The compression spring 42, which has an outer diameter of about 0.375 inches and is approximately 2.5 inches long, slides inside the outer tube 68 and over the inner tube 72 until it rests against the middle tube 70. Thus, most of the spring 42 is left exposed on the end 76 where the finger tabs are located.

The flexible wire 44 attached to the stem 41 of the control knob 40 is fed through the compression spring 42 and inner tube 42, through the hollow cable 34, and through the back of the cylinder head 16 where the wire is attached to the piston assembly 24. The stem 41 of the control knob 40, with the knob attached, now extends into the compression spring 42 and the inner tube 72 until the end of the compression spring rests against the base 84 of the knob 40, as may be seen in FIG. 4.

Figures 4, 5:
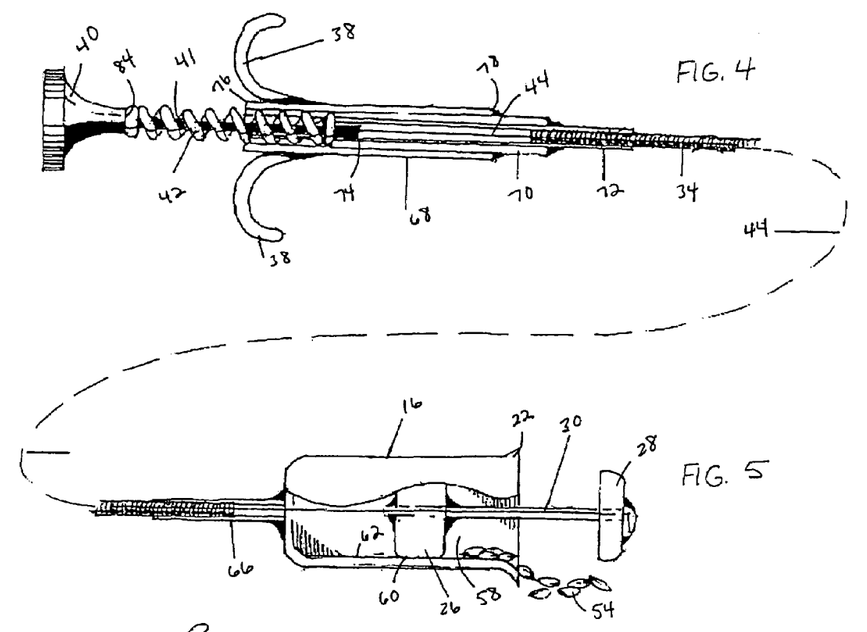
FIG. 4 is a partial cut-away side view of a plurality of tubular members within the handle assembly of the activator mechanism of the rodent bait dispenser of FIG. 1.
FIG. 5 is a partial cut-away side view of a cylinder head and cylinder head tube within the dispenser assembly of the rodent bait dispenser of FIG. 1.

When activated, the control knob 40 compresses the spring 42 against the middle tube 70 and pushes the wire 44 forward through the back of the cylinder head 16. As a result, the piston assembly 24 is pushed outward which, in turn, forces the bait contents 54 of the bait chamber 58 out of the cylinder, as shown in FIG. 5. When the control knob is released, the spring automatically retracts the piston assembly into the cylinder head, holding the bait chamber in a closed position, as shown in FIG. 1.

The embodiment as just described may be assembled as follows.

Step #1. First, solder the arched finger supports 38 on opposite sides of the outer tube 68, with the high point of the arch even with the end 76 of the outer tube 68. Insert the middle tube 70 into the outer tube 68 at the end 78 opposite the finger supports until 0.5 inches of the middle tube remain exposed, and solder. Then insert the inner tube 72 into the middle tube 70 until 1 inch of the inner tube remains exposed and solder; at this time the inner tube 72 and the outer tube 68 should be even on the finger support end 76. Insert the flexible sleeve 34 into the inner tube 72 approximately 1 inch and crimp the exposed inner tube slightly around, inserting the sleeve to hold it in place while taking care not to close the hollow opening of the sleeve.

Step #2. Attach the cylinder head tube 66 over the hole 64 at the closed end 18 of the cylinder 16 and solder. Set aside.

Step #3. Insert central rod 30 through the hole 27 in the bait moving piston 26 and solder. At the opposite end, insert the central rod 30 just through the hole 29 in the end cap 28 with the cupped side 56 facing inward, even with the end of the rod. Set aside.

Step #4. Take the control knob 40 and stem 41 with the wire 44 attached and thread it through the compression spring 42. The wire 44 will continue through the inner tube 72 and into and through the sleeve 34. The compression spring will slide over the inner tube and into the outer tube, seating against the middle tube.

Step #5. Slide the cylinder head tube 66 and cylinder head 16 over the open end of the wire and sleeve until approximately 4-6 inches of the sleeve are exposed beyond the flared edge 22 of the cylinder head 16.

Step #6. Insert the open end of the wire 44 into the end 86 of the rod 30 which is through the bait moving piston 26, and extend the wire out the far end 88 of the rod and through the hole 29 in the end cap 28 to protrude by about 0.25 inches; bend the protruding portion 90 of the wire to about a ninety degree turn, and solder the cupped end cap 28, the rod 30 and the bent wire 90 together at the end of the rod.

Step #7. Slide the cylinder head tube 66 and the cylinder head 16 down the cable and over the bait moving piston 26 until the end cap 28 and wire are just inside the open end 20 of the cylinder head 16. The flexible sleeve should be approximately 1 inch inside the cylinder head tube 66. Crimp the cylinder head tube 66 slightly around the cable 34 to hold it in place, noting that heavy crimping may result in restricted wire movement.

Figures 6, 7:
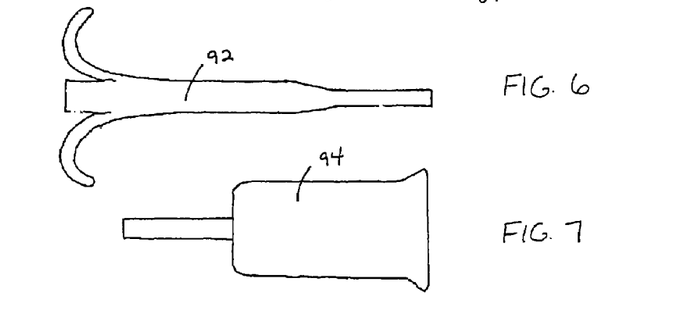
FIG. 6 illustrates the plurality of tubular members of the handle assembly of FIG. 4, constructed out of plastic as a unitary member.
FIG. 7 illustrates the cylinder head and cylinder head tube of the dispenser assembly of FIG. 5, constructed out of plastic as a unitary member.

The housing may alternatively be constructed as a single unit 92 made from plastic, as shown in FIG. 6. Similarly, the combination of the cylinder head tube and the cylinder head may alternatively be constructed as a single unit 94 made from plastic, as shown in FIG. 7. The latter combination is preferably from transparent plastic to allow the bait to be seen within the bait chamber when the piston assembly is in the retracted position.

In operation, the user grips the handle with the fingers 50, 52 under the tabs 38 and the thumb 48 against the control knob 40, as shown in FIGS. 2A and 2B. Alternatively, the user may wish to apply the pressure to the knob using the palm of the hand. The user then applies pressure with the thumb 48 (or the palm) against the knob 40, pushing it into the housing portion 36 of the handle. This activates the cylinder head, forcing the piston assembly 24 out of the cylinder head 16.

Holding the handle in this position, the user submerges the open cylinder head into a bait container (not shown) and releases the knob, allowing the spring-loaded handle to automatically draw the piston assembly and bait back into the cylinder head, filling the bait chamber.

The loaded cylinder head is then removed from the bait container and inserted into a gopher hole or run. When the cylinder head has been inserted to the desired depth and/or location within the run, the user again applies pressure to the knob with the thumb or palm. This will force the bait moving piston of the piston assembly forward, and expel the bait from the cylinder, regardless of the position of the cylinder, i.e., whether facing upwardly or downwardly or at any angle. In addition, no shaking or other motions of the cylinder and/or handle are needed to empty the chamber. Furthermore, because of the action of the piston assembly, positive displacement of the bait is assured even in damp or wet soil.

A second embodiment of the present invention is shown in FIGS. 8-11. Many of the structural features of this second embodiment are shared with the first embodiment and so will not be repeated here.

Figures 8, 9:
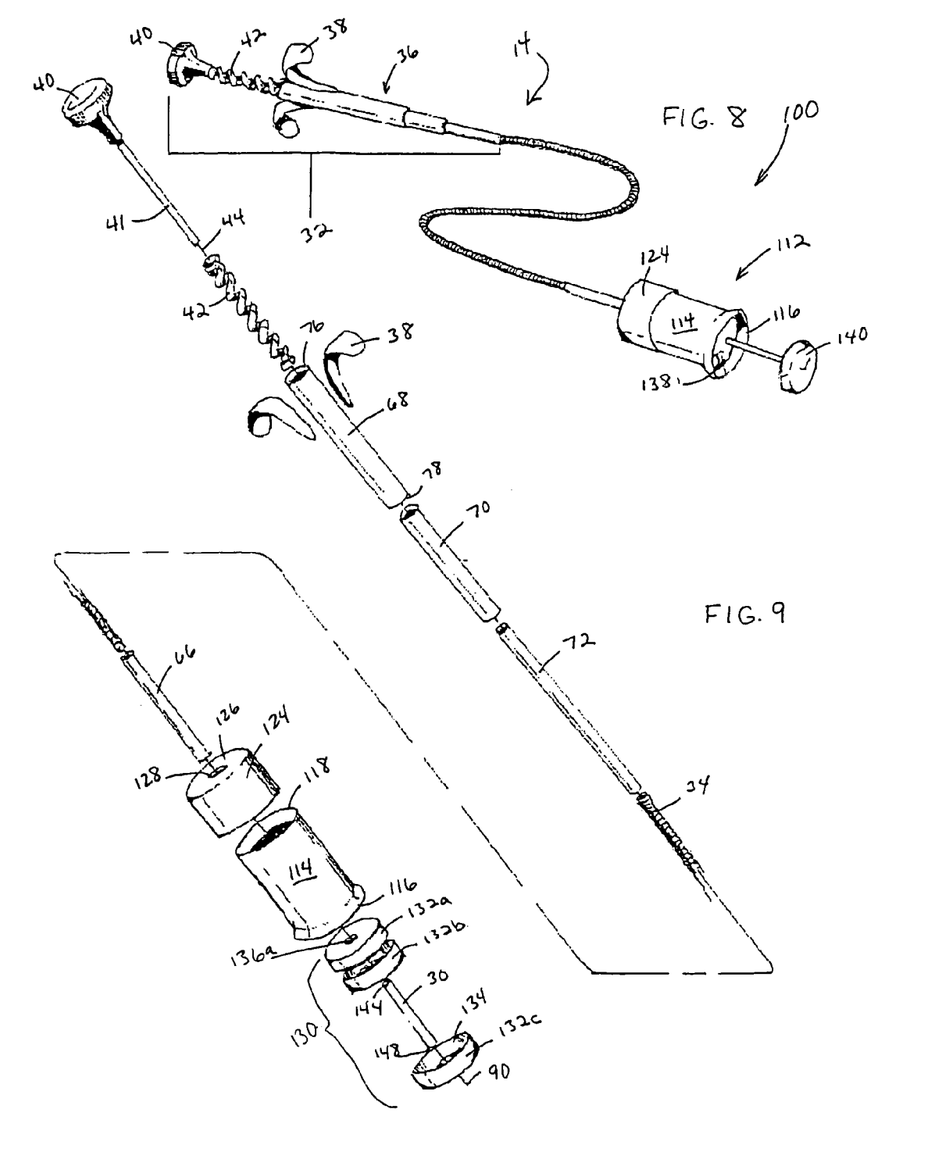
FIG. 8 shows another embodiment of a rodent bait dispenser including an activator mechanism and a dispenser assembly in accordance with the present invention.
FIG. 9 is an exploded view of the components of the rodent bait dispenser of FIG. 8.
Figure 11:
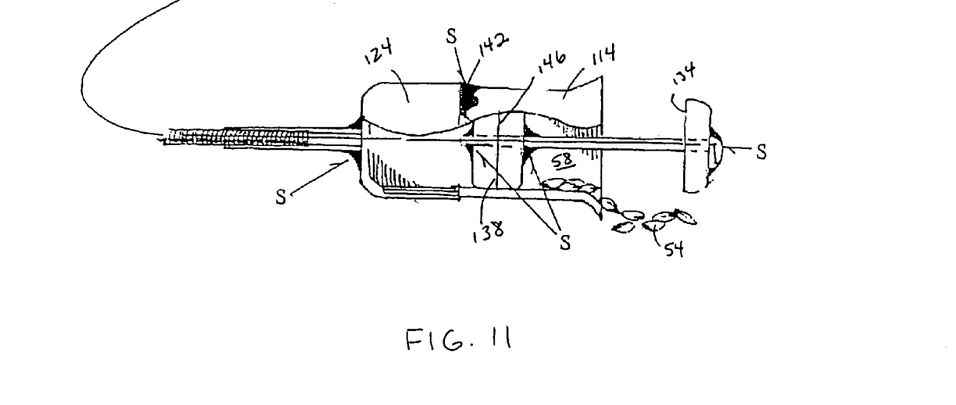
FIG. 11 is a partial cut-away view of a cylinder head and cylinder head tube within the dispenser assembly of the rodent bait dispenser of FIG. 8.

As can be seen in FIGS. 8, 9 and 11, the dispenser 100 includes a dispenser assembly 112 and an activator assembly 14. The activator assembly 14 is the same as that in the first embodiment.

The dispenser assembly 112 includes a tubular member 114 having two open ends 116, 118. The tubular member 114 has an outer diameter of about 1.125 inches (1⅛") and an inner diameter of about 1 inch, and is about 2 inches in length. The distal end 116 relative to the handle assembly 32 is flared. Fitted over the proximal end 118 is a cap 124 having an inner diameter of about 1.125 inches (1⅛"), and a length of about one inch. Formed in the top portion 126 of the cap 124 is a center hole 128 having an inner diameter of about 0.25 inches.

The piston assembly 130 includes a plurality of round flat discs 132 with cupped edges 134. Each disc 132 has an outer diameter of about 1 inch, cupped edges 134 of about 0.25 inches in length, and a center hole 136 having an inner diameter of about 0.125 inches. The central rod 30 fits through the center holes 136 of the discs 132. The rod has an outer diameter of about 0.125 inches and an inner diameter of about 0.0625 inches for accommodating the wire 44.

As shown in FIGS. 9 and 11, two of the discs 132a, 132b are connected, generally by soldering, with their cupped edges abutting in order to form the bait moving piston 138, while a third disc 132c facing inwardly forms the end cap 140.

Figure 10:
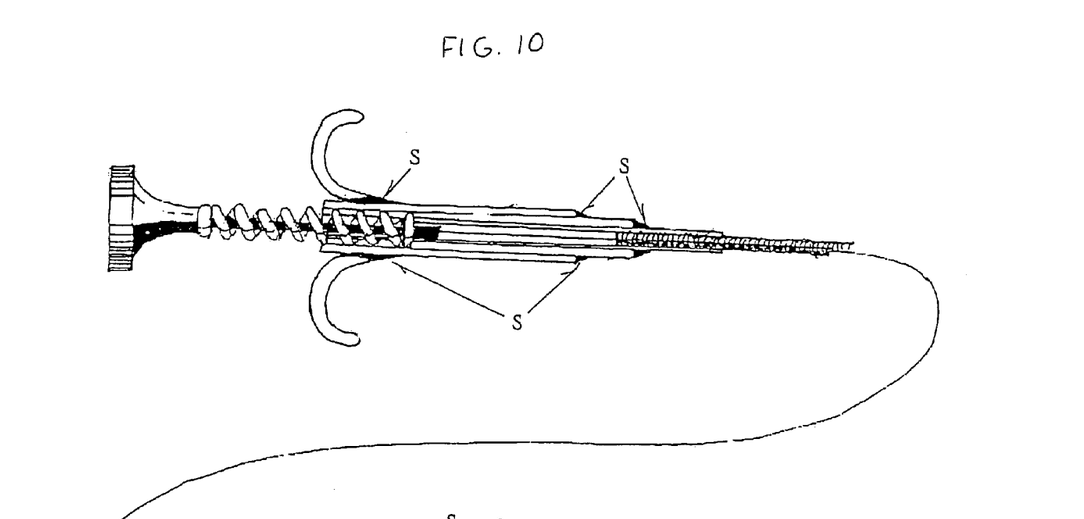
FIG. 10 is a partial cut-away view of a plurality of tubular members within the handle assembly of the activator mechanism of the rodent bait dispenser of FIG. 8.

The second embodiment as just described may be assembled as follows. Soldered joints in FIGS. 10 and 11 are designated by the letter "S".

Step #1. First, solder the arched finger supports 38 on opposite sides of the outer tube 68, with the high point of the arch even with the end 76 of the outer tube 68. Insert the middle tube 70 into the outer tube 68 at the opposite end 78 thereof until about 0.5 inches of the middle tube 70 remain exposed, and solder. Then insert the inner tube 72 into the middle tube 70 until about 1 inch of the inner tube 72 remains exposed and solder, at which time the inner tube 72 and the outer tube 68 should be even on the finger support end 76. Insert the flexible sleeve 34 into the inner tube 72 approximately 1 inch and crimp the exposed inner tube slightly around, inserting the cable to hold it in place while taking care not to close the hollow opening of the sleeve.

Step #2. Insert the cylinder head tube 66 into the hole 128 of the cap 124 and solder. Slip the cap 124 over the proximal end 118 of the tubular member 114 until seated and solder the cap joint 142. Set aside.

Step #3. Insert central rod 30 through the hole 136a of disc 132a, with the cupped side 134 facing out, and insert a second disc 132b onto the rod 30 with the cupped side 134 facing in. Join the two cupped discs 132a, 132b together at the end 144 of the rod 30 and solder both on the outside joint 146 of the joined discs. At the opposite rod end 148, insert the rod through a third disc 132c with the cupped side 134 facing inward, even with the end 148 of the rod. Set aside.

Step #4. Take the control knob 40 and stem 41 with the wire 44 attached and thread it through the compression spring 42. The wire will continue through the inner tube 72 and into and through the sleeve 34. The compression spring 42 will slide over the inner tube 72 and into the outer tube 68, seating against the middle tube 70.

Step #5. Slide the cylinder head tube 66 and tubular member 114 over the open end of the wire and sleeve until approximately 4-6 inches of the cable is exposed beyond the flared distal end 116 of the tubular member.

Step #6. Insert the open end of the wire into the end 144 of the rod where the joined discs are located. Extend the wire out the far end 148 of the rod and through the end cap 140 to protrude by about 0.25 inches; bend the protruding portion 90 of the wire to about a ninety degree turn, and solder the cupped disc 132c, the rod 30 and the bent wire 90 together at the end of the rod 148.

Step #7. Slide the cylinder head tube 66, the cap 124 and the tubular member 114 down the cable 34 until the joined discs forming the bait moving piston 138, the rod 30 and the wire 44 are just inside the tubular member 114. The flexible sleeve should be approximately 1 inch inside the cylinder head tube 66. Crimp the cylinder head tube 66 slightly around the sleeve to hold it in place, noting that heavy crimping may result in restricted wire movement.

As with the first embodiment, the housing may alternatively be constructed as a single unit 92 made from plastic, as shown in FIG. 6. Similarly, the combination of the cylinder head tube, the cap and the tubular member may alternatively be constructed as a single unit 94 made from plastic, as shown in FIG. 7. The latter combination is preferably from transparent plastic to allow the bait to be seen within the bait chamber when the piston assembly is in the retracted position.

A further preferred embodiment is shown in FIGS. 12-17. As with the previous embodiments, the rodent bait dispenser generally designated by reference numeral 200 includes a dispenser assembly, generally designated by the reference numeral 212, and an activator mechanism, generally designated by the reference numeral 214.

Figure 12:
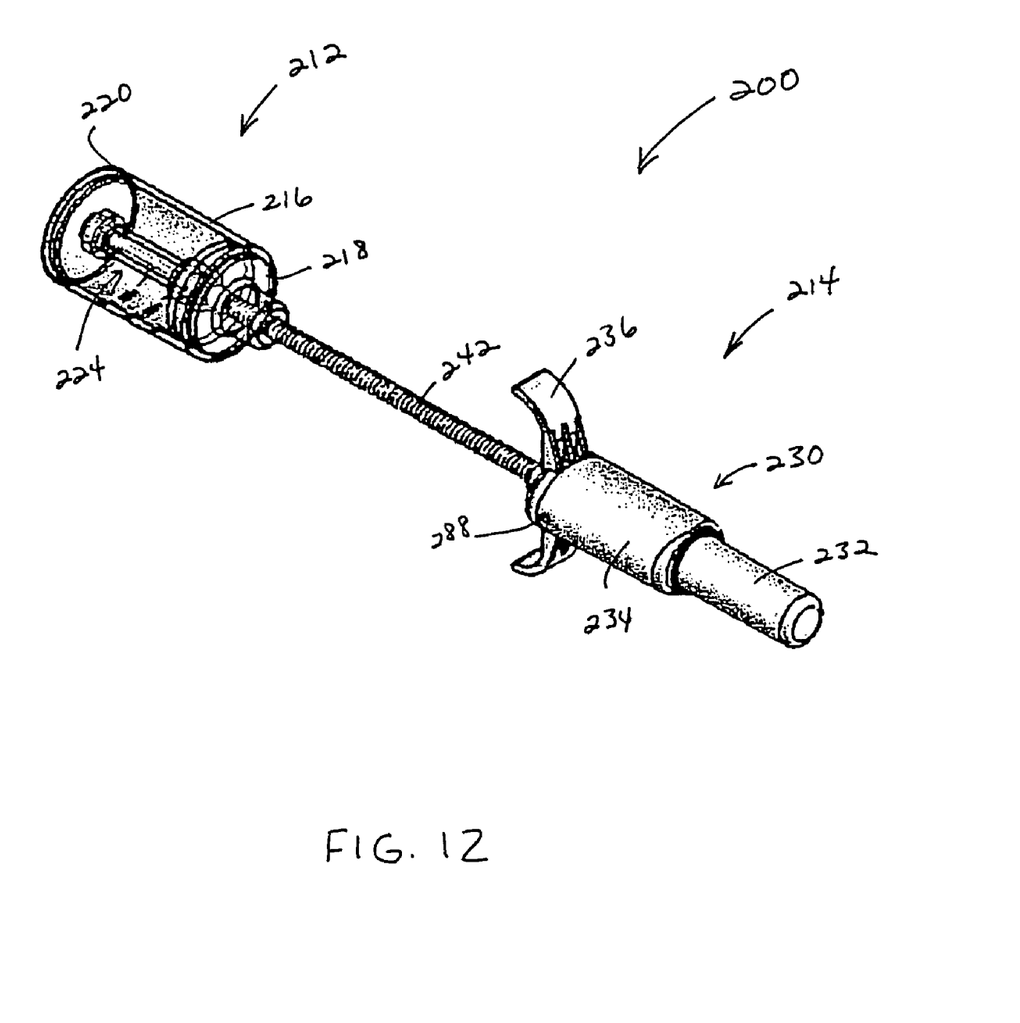
FIG. 12 is a perspective view of a further preferred embodiment of a rodent bait dispenser including an activator mechanism and a dispenser assembly in accordance with the present invention.
Figures 13, 15:
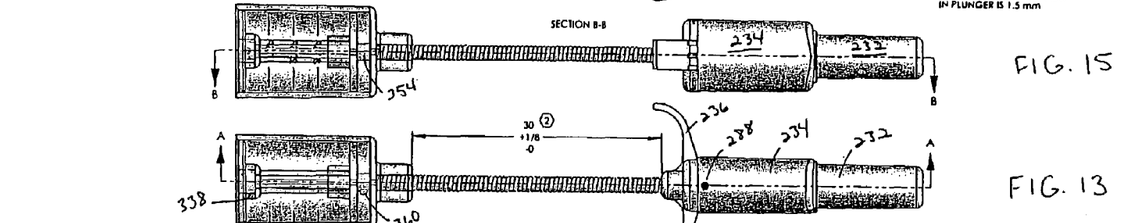
FIG. 13 is a side view of the rodent bait dispenser of FIG. 12.
FIG. 15 is top view of the rodent bait dispenser of FIG. 12.

The dispenser assembly 212 includes a bait dispensing cylinder head 216 that is generally cylindrical with a closed end 218 and an open end 220. Slidably disposed in the cylinder head 216 for movement through the open end is a piston assembly generally designated by the reference numeral 224.

The activator mechanism 214 includes a handle assembly generally designated by the reference numeral 230 and a flexible sleeve 242 that is coupled to the piston assembly 224. Running through the sleeve 242 is a wire 244 as in the previous embodiments.

The handle assembly 230 includes a plunger 232, a plunger housing 234, a finger grip 236, and a spring 238. The plunger 232 and plunger housing 234 fully enclose the spring 238, and the wire 244 runs through centered openings in the plunger 232, plunger housing 234, finger grip 236 and spring 238. The plunger, plunger housing and finger grip are preferably made of polycarbonate, although other rigid polymer or suitable materials may also be used.

The plunger 232 is sized to fit within the plunger housing 234 so as to nest therein during activation of the activator mechanism 214. More specifically, the plunger 232 can be moved toward the finger grip 236, as shown in FIG. 17, against the bias of the spring 238, pushing the wire 244 housed within the sleeve 242 and resulting in extension of the piston assembly 224. When the plunger 232 is released, the spring 238 automatically returns the plunger to a fully retracted position as shown in FIGS. 12-16.

Figure 14:
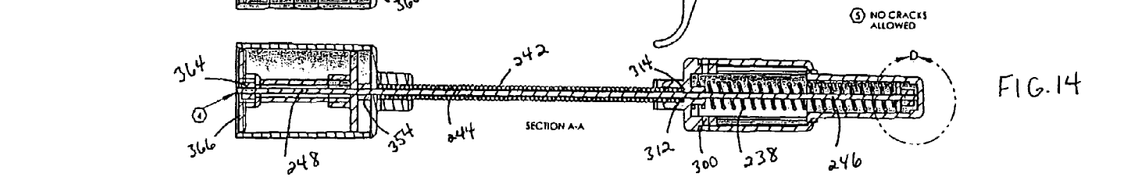
FIG. 14 is a cross-sectional view taken along line A-A of FIG. 13.
Figure 16:
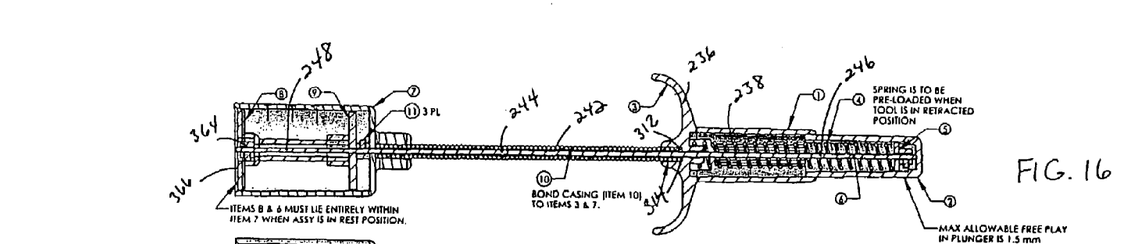
FIG. 16 is a cross-sectional view taken along line B-B of FIG. 15.
Figure 17:
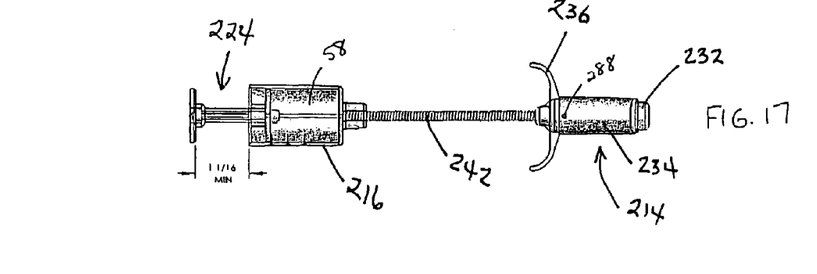
FIG. 17 is a partially cut-away side view of the rodent bait dispenser of FIG. 12, shown with the handle assembly of the activator mechanism activated and the piston assembly of the dispenser assembly in the extended position.
Figures 18, 19:
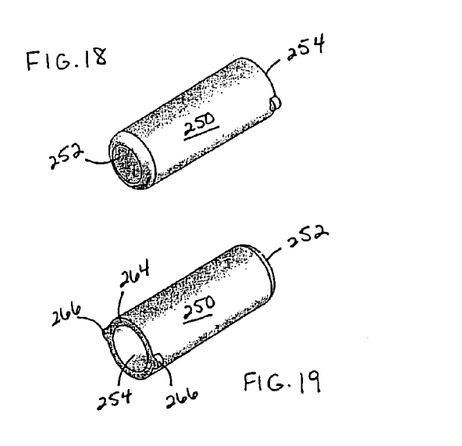
FIG. 18 is a perspective view of the plunger of the bait dispenser of FIGS. 12-17.
FIG. 19 is another perspective view of the plunger of the bait dispenser of FIGS. 12-17 from the opposite end shown in FIG. 18.
Figure 20:
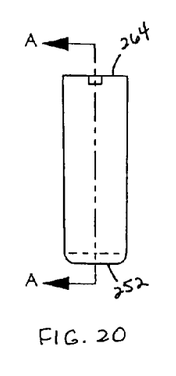
FIG. 20 is a side view of the plunger of FIGS. 18 and 19.
Figure 21:
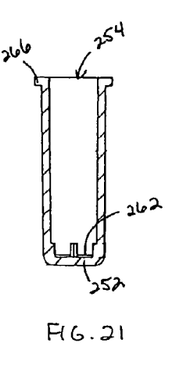
FIG. 21 is a cross-sectional view taken along line A-A of FIG. 20.
Figures 22, 23, 26:
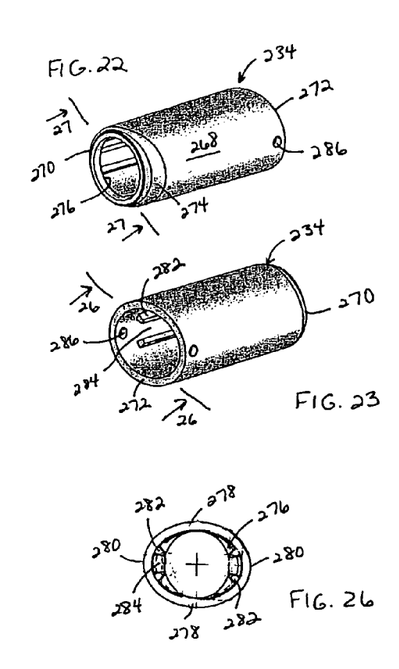
FIG. 22 is a perspective view of the plunger housing of the bait dispenser of FIGS. 12-17.
FIG. 23 is another perspective view of the plunger housing of the bait dispenser of FIGS. 12-17 from the opposite end shown in FIG. 22.
FIG. 26 is a view taken along line 26-26 of FIG. 23.
Figure 24:
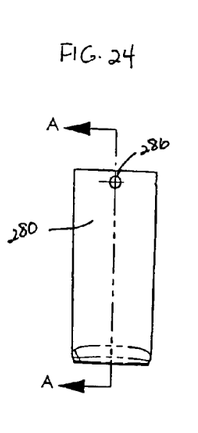
FIG. 24 is a side view of the plunger housing of FIGS. 22 and 23.
Figure 25:
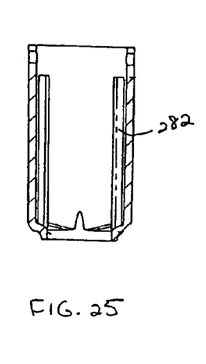
FIG. 25 is a cross-sectional view taken along line A-A of FIG. 24.
Figure 27:
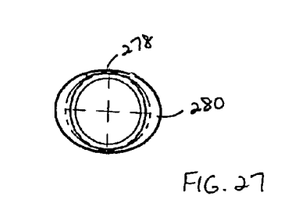
FIG. 27 is a view taken along line 27-27 of FIG. 22.
Figure 28:
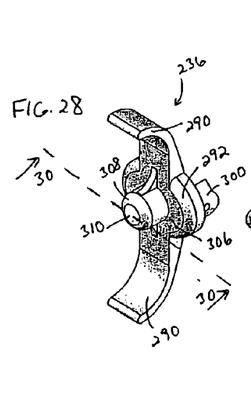
FIG. 28 is a perspective view of the finger grip of the bait dispenser of FIGS. 12-17.
Figure 29:
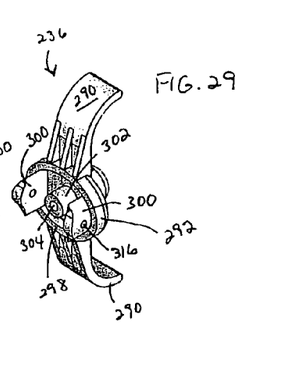
FIG. 29 is another perspective view of the finger grip of the bait dispenser of FIGS. 12-17 from the opposite side shown in FIG. 28.
Figure 30:
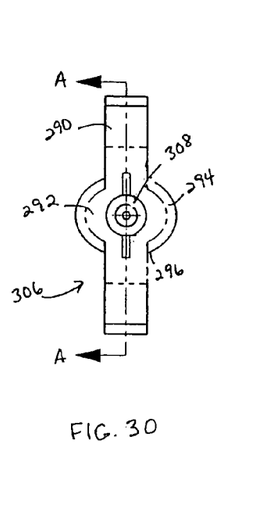
FIG. 30 is a view taken along line 30-30 of FIG. 28.

As can be seen in FIGS. 14 and 16, the wire 244 is longer than the sleeve 242 such that, while the center portion of the wire is housed within the sleeve 242, the wire extends unsheathed from the sleeve on both ends to define exposed portions. The exposed handle portion 246 of the wire 244 is received within the handle assembly 230, while the exposed dispenser portion 248 of the wire 244 is received within the cylinder head 216 and piston assembly 224.

Figure 14A:
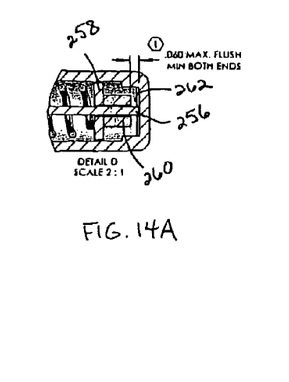
FIG. 14A is an enlarged view of detail "D" of FIG. 14.

As shown in greater detail in FIGS. 18-21, the plunger 232 has a generally cylindrical body 250 with one closed end 252 and one open end 254. The spring 238 and the end 256 of the handle portion 246 of the wire are placed in abutment with the closed end 252 as shown in the detail of FIG. 14A. A washer 258 is fitted over the end 256 of the handle portion 246 of the wire 244 and a metal plug 260 is crimped on the wire end to secure the spring 238 in its position around the handle portion 246 of the wire when the plunger 232 and plunger housing 234 are removed. The washer 258 and metal end plug 260 also provide a bearing surface for the spring and the wire against the inner surface 262 of the closed end 252 when the handle assembly 230 is fully assembled and operational.

Adjacent the edge 264 of the open end 254 of the plunger 232 are two diametrically opposed protruding stops 266. These stops 266 guide and align the plunger 232 within the plunger housing 234 and prevent the plunger from passing entirely out through the open outer end of the housing once inserted therein.

As shown in detail in FIGS. 22-27, the plunger housing 234 is open on both ends 270, 272 and has a body portion 268 with a generally elliptical cross section. The outer end 270 of the plunger housing 234 has a necked portion 274 in which the inner diameter is reduced. The reduction in diameter of the housing 234 forms a shoulder 276 between the necked portion 274 and the body portion 268. The base end 272 of the plunger housing 234 is distal from the necked portion 274.

The inner diameter of the two closest oblong sides, referred to herein as the long sides 278, is sufficient to accommodate the outer diameter of the plunger 232 when the latter is inserted, closed end 252 first, into the plunger housing 234. Positioned along the inner surface of each of the oblong sides spaced furthest from one another, referred to herein as the short sides 280, is a pair of longitudinally running ribs 282 that are spaced to define a channel 284. The channel 284 is sized to accommodate the corresponding stop 266 of the plunger 232 when the plunger is nested within the plunger housing 234. As the plunger moves through the housing 234, the plunger rides along the long sides 278 and the inner surfaces of the ribs 282, but with sufficient clearance to ensure there is no friction or binding between the interfacing surfaces.

When the handle assembly 230 is fully assembled, and the dispenser assembly 212 is activated by pushing the plunger 232 toward a more nested position within the housing 234, the radial orientation or alignment of the plunger within the housing is maintained by the containment of the stops 266 within the ribbed channels 284 as the plunger moves in and out through the necked portion 274 of the housing. When the plunger 232 is fully retracted through the action of the spring, the abutment of the stops 266 against the shoulders 276 retains the open end 254 of the plunger 232 within the housing 234.

An aperture 286 is formed through each of the short sides 280 adjacent the base end 272 of the housing 234. Each aperture 286 is generally centered between a respective pair of ribs 282 but does not lie therebetween as the ribs 282 do not extend that closely to the edge of the base end 272. The apertures 286 are sized to receive fastening elements 288 which are used to secure the housing 234 to the finger grip 236.

As shown in greater detail in FIGS. 28-31, the finger grip 236 includes two arched finger supports 290 integrally formed with a base member 292. The base member is generally elliptical so as to have two short sides 294 and two long sides 296. The finger supports 290 extend outwardly from the long sides 296 toward the finger support side 306 of the base member.

The plunger side 298 of the base member 292 includes two outwardly extending flanges 300 formed on the short sides 294 of the base member 292, and a substantially centered cylindrical mounting stub 302 with through-passing hole 304 therein. The finger support side 306 of the base member 292 is provided with a tubular extension 308 for securing the sleeve 242 to the finger grip 236. The tubular extension 308 has an aperture 310 therein that is aligned with the hole 304 in the mounting stub 302.

When assembling the handle, the exposed handle portion 246 of the wire 244 is passed through the aperture 310 in the tubular extension 308 and the aligned hole 304 in the mounting stub 302 of the base member 292 until the end 312 of the sleeve 242 comes into abutment with the inner surface 314 of the tubular extension 308. The spring 238 is fitted over the exposed handle portion 246 of the wire and mounted on the mounting stub 302. The washer 258 and plug piece 260 are then secured to the end 256 of the exposed handle portion 246 of the wire 244. The plunger 232 is inserted within the plunger housing 234, with the stops 266 running along the ribbed channels 284, to form a nested arrangement which is placed over the spring 238. With the end plug 260 in abutment with the inner surface 262 of the plunger tip, the base end 272 of the plunger housing 234 is fitted over the flanges 300, while bringing the apertures 286 in the housing into alignment with corresponding apertures 316 in the flanges 300. Fastening elements 288 are then inserted through the aligned apertures 286, 316 to secure the housing 234 to the base member 292.

Figures 31, 33:
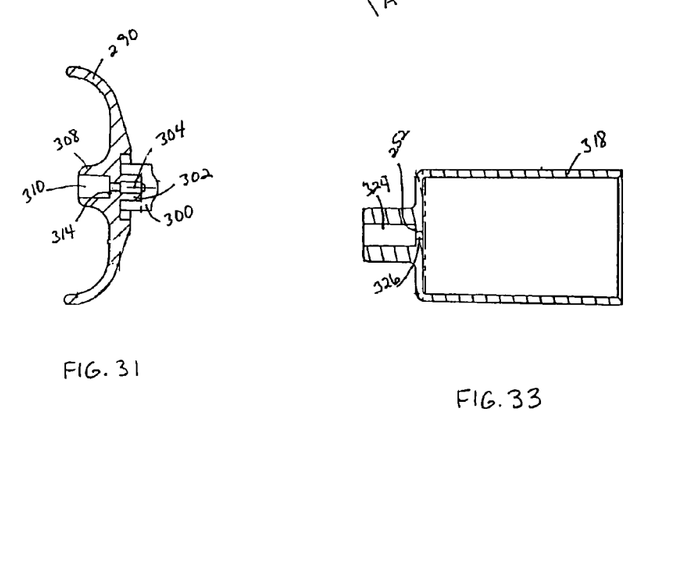
FIG. 31 is a cross-sectional view taken along line A-A of FIG. 30.
FIG. 33 is a cross sectional view taken along line A-A of FIG. 32.
Figure 32:
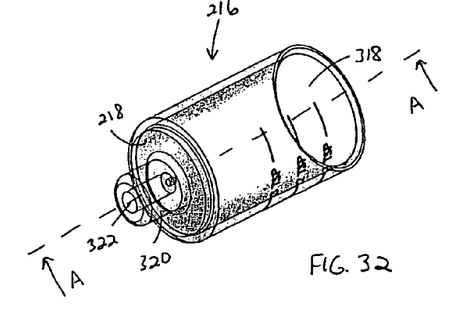
FIG. 32 is a perspective view of the cylinder head of the dispenser assembly of the rodent bait dispenser of FIGS. 12-17.

The bait dispensing cylinder head 216 is preferably formed as a unitary member of polycarbonate or other rigid polymer or suitable material and is shown in greater detail in FIGS. 32 and 33. As shown, the cylinder head 216 has a generally cylindrical body portion 318 and a smaller tubular portion 320 on the closed end 218 with a bore 322 running therethrough. The bore 322 has two sections with two different inner diameters. The first section 324 is sized to frictionally receive and hold the sleeve 242, and the second section 326 has a smaller inner diameter to receive only the wire 244.

Figure 34:
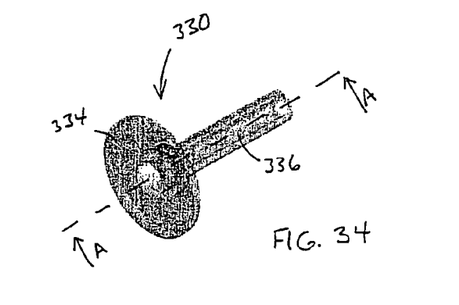
FIG. 34 is a perspective view of the canister end of the dispenser assembly of the bait dispenser of FIGS. 12-17.
Figure 35:
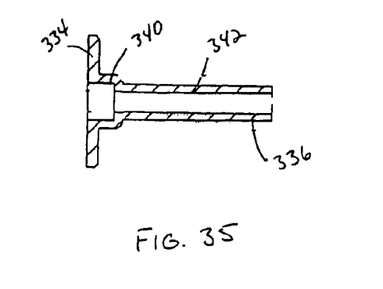
FIG. 35 is a cross sectional view taken along line A-A of FIG. 34.
Figure 36:
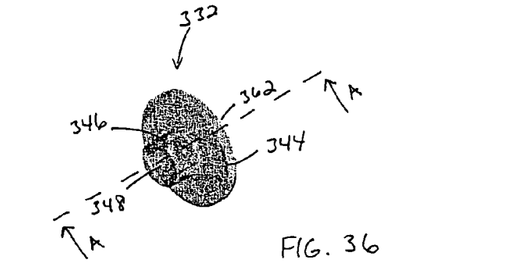
FIG. 36 is a perspective view of the canister base of the dispenser assembly of the bait dispenser of FIGS. 12-17.
Figure 37:
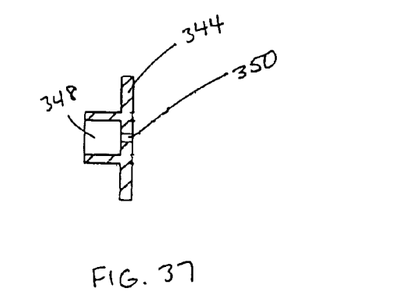
FIG. 37 is a cross sectional view taken along line A-A of FIG. 36.

The piston assembly 224 fitted within the cylindrical body portion 318 of the cylinder head 216 is formed of a canister end 330 shown in greater detail in FIGS. 34 and 35, and a canister base 332 shown in greater detail in FIGS. 36 and 37.

The canister end 330 includes a generally cylindrical end cap disc 334 with a tubular rod 336 extending therefrom. The tubular rod 336 is joined to the end cap disc 334 through a broadened portion 338 having a larger inner diameter 340 than the inner diameter 342 of the rod 336. The larger inner diameter 340 of the broadened portion 338 extends through the end cap disc 334, as shown in FIG. 35.

The canister base 332 includes a generally cylindrical bait moving piston disc 344 with a tubular extension 346 centered therein. The tubular extension 346 has a bore 348 sized to frictionally receive and hold the tubular rod 336 of the canister end 330. A through-passing aperture 350 in the bait moving piston disc 344 is sized to accommodate the exposed dispenser portion 248 of the wire 244.

When assembling the dispenser assembly 212, the exposed dispenser portion 248 of the wire 244 is first passed through the tubular portion 320 and body 318 of the cylinder head 216 until the sleeve 242 is frictionally engaged in the first section 324 of the tubular portion 320 and in abutment with the edge 252 of the second section 326 thereof. The exposed dispenser portion 248 of the wire is then passed through a wire holder 354, illustrated in FIGS. 38 and 39.

Figure 38:
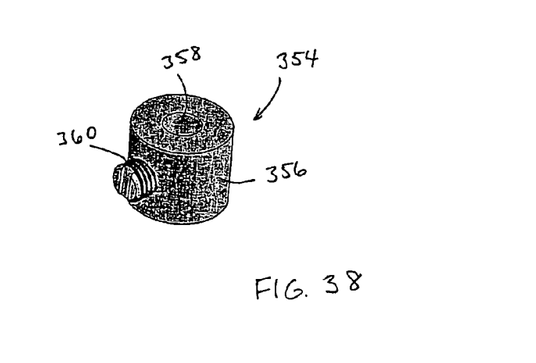
FIG. 38 is a perspective view of the wire holder of the dispenser assembly of the bait dispenser of FIGS. 12-17.
Figure 39:
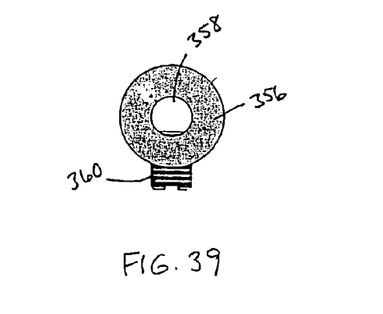
FIG. 39 is a top view of the wire holder of FIG. 38.

The wire holder 354 includes a generally cylindrical member 356 with an axial bore 358 and a set screw 360 arranged generally perpendicular to the bore 358. Once the wire has been passed through the bore 358 a sufficient distance, the set screw 360 is tightened to lock the wire holder 354 in position.

The exposed dispenser portion 248 of the wire is then passed through the aperture 350 in the canister base 332, starting from the flat side 362 of the bait moving piston disc 344. The tubular rod 336 of the canister end 330 is then fitted over the wire and into frictional engagement within the bore 348 of canister base tubular extension 346. The end of the wire extending into the broadened portion 338 of the tubular rod 336 is then fitted with a metal end piece 364 that locks all the components of the piston assembly 224 in place. The metal end piece 364 is fully enclosed within the broadened portion 338 so that the outer surface 366 of the end cap disc 334 is flat.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A rodent bait dispenser comprising:

a dispenser assembly;

said dispenser assembly having a bait dispensing head with a piston slidably disposed therein to define a bait chamber in said bait dispensing head;

said bait dispensing head comprising a substantially closed proximal end and an open distal end;

said piston assembly including a pair of piston members fixedly spaced with respect to each other, a first piston member of said pair acting as an end cap for said bait dispensing head and a second piston member of said pair serving as a bait moving piston; and an activator mechanism having a handle and having a wire generally enclosed by a flexible sleeve;

said flexible sleeve disposed between the activator mechanism and the proximal end of the bait dispensing head;

said wire coupled to said piston assembly for controlling extension and retraction of said piston assembly in relation to said bait dispensing head;

wherein, in a retracted position, said piston assembly is entirely contained within said bait dispensing head such that the first piston member caps said open distal end; and wherein, in an extended position, the piston assembly is extended distally away from said bait dispensing head such that the first piston member extends out of said bait chamber to expose said bait chamber.

2. The dispenser as set forth in claim 1:

wherein said handle includes a plunger element operatively coupled with a spring such that activation of the plunger element compresses the spring while extending the wire distally toward the dispenser assembly to extend the said piston assembly to the extended position, said spring automatically retracting said piston assembly back into said bait dispensing head upon release of said plunger element; and wherein said plunger element reciprocates within a plunger housing connected to said sleeve;

said plunger housing having finger engaging elements to facilitate compression of said spring from movement of said plunger element and said wire to extend said piston assembly.

3. The dispenser as set forth in claim 1:

wherein said wire is connected between said handle and said piston assembly;

wherein said handle includes a plunger element operatively coupled with a spring and connected to said wire such that activation of the plunger element compresses the spring while pushing the wire distally within said sleeve toward the dispenser assembly to extend the said piston assembly to the extended position;

wherein release of said plunger element causes said spring to automatically retract said wire to move said piston assembly back into said bait dispensing head.

4. The dispenser as set forth in claim 1;

wherein said handle includes a plunger element operatively coupled with a spring such that activation of the plunger element compresses the spring while extending the wire distally toward the dispenser assembly to extend the said piston assembly to the extended position, said spring automatically retracting said piston assembly back into said bait dispensing head upon release of said plunger element; and wherein said substantially closed end of said bait dispensing head has a small aperture therein;

said wire having a distal end and a proximal end, said distal end of said wire passing through said aperture for connection to said piston, said proximal end of said wire being connected to said plunger element.

5. A rodent bait dispenser, comprising:

a dispenser;

said dispenser having a bait dispensing head with a piston assembly slidably disposed therein;

said bait dispensing head having a substantially closed proximal end and an open distal end opposite said closed proximal end;

said piston assembly including a pair of substantially parallel piston members coupled in a fixed space relation by a rod, a first piston member of said pair serving as a bait moving piston and a second piston member of said pair acting as an end cap for closing said open distal end of said dispensing head;

said piston assembly having a first position in which said pair of piston members are retracted so as to retain bait in said bait chamber between said bait moving piston and said end cap, and a second position in which the piston assembly is extended distally outward and away from the bait dispensing head such that said bait moving piston assembly moves distally along said bait chamber toward said open end, thereby forcing bait out of the bait chamber; and an activator mechanism remotely coupled to the piston assembly via a flexible sleeve;

wherein said activator mechanism is configured to remotely move said piston assembly from the first position to the second position with respect to said bait dispensing head.

6. The dispenser as set forth in claim 5;

wherein the activator mechanism comprises a handle with a plunger element coupled to said piston assembly for controlling extension and retraction of said piston;

wherein said plunger element is connected to said piston assembly by a wire generally enclosed by and slidably movable within said sleeve.

7. The dispenser as set forth in claim 6, wherein said wire moves within said sleeve in response to compression of said plunger element to move said piston assembly to said second position, said piston assembly being spring-biased to said first position in an absence of plunger element compression.

8. The dispenser as set forth in claim 7, wherein said handle further comprises finger engaging elements to facilitate compression of said plunger element.

9. The dispenser as set forth in claim 5, wherein said plunger element reciprocates within a plunger housing and is operatively coupled with a spring, said spring being fully enclosed within said plunger element and said plunger housing.

10. A rodent bait dispenser comprising:

a dispenser assembly having a bait dispensing head with a piston assembly slidably disposed therein;

said bait dispensing head having a substantially closed proximal end and an open distal end;

said piston assembly including a pair of spaced apart piston members fixedly spaced with respect to each other to define a bait chamber in combination with said dispensing head;

said piston assembly having an extended position and a retracted position with respect to said bait dispensing head;

wherein said piston assembly is configured to slideably translate along said bait chamber from the retracted position to the extended position;

wherein, in the retracted position, the piston assembly is oriented at a location that encloses said open distal end of the bait dispensing head;

wherein, in the extended position, at least a portion of the piston assembly is oriented distally away from the bait dispensing head to expose said bait chamber;

wherein bait is contained within said bait chamber when said piston assembly is in said retracted position; and an activator mechanism proximal to said dispenser assembly;

said activator mechanism having a plunger element coupled to said piston assembly by a connecting element for controlling extension and retraction of said piston assembly in relation to said bait dispensing head;

said plunger element being biased in a proximal direction by a biasing element;

wherein said plunger element is configured to reciprocate within a housing to facilitate compression of said biasing element and a corresponding distal extension of said connecting element with respect to said bait dispensing head to move said piston assembly into said extended position to expel bait from said chamber.

11. The dispenser as set forth in claim 10, wherein a first piston member of said pair acts as an end cap for closing off said distal open end of bait dispensing head and a second piston member of said pair serves as a bait moving piston to expel bait from said bait chamber upon distal extension of said connecting element and piston.

12. The dispenser as set forth in claim 10, wherein said connecting element is a wire generally enclosed by and slidably movable within a flexible, non-compressible sleeve.

13. A rodent bait dispenser, comprising:
an activator assembly; and
dispenser means, coupled to said activator assembly, for retaining rodent bait and dispensing rodent bait in response to operation of said activator assembly;
wherein said dispenser means comprises:
   a bait dispensing head with a piston assembly slidably disposed therein to define a bait chamber in said bait dispensing head;
   said bait dispensing head having a substantially closed proximal end and an open distal end;
   said piston assembly including a pair of piston members fixedly spaced with respect to each other, a first distal piston member of said pair acting as an end cap for said cylinder head and a second proximal piston member of said pair serving as a bait moving piston;
wherein said piston assembly is configured to slideably translate along said bait chamber from the extended position to the retracted position;
wherein, in the retracted position, the piston assembly is oriented at a location such that the end cap encloses said open distal end of the bait dispensing head; and
wherein, in the extended position, the end cap is oriented distally away from the bait dispensing head to expose said bait chamber.

14. A rodent bait dispenser as recited in claim 13, wherein said activator assembly comprises:
a handle, and a wire generally enclosed by a flexible sleeve;
said sleeve coupled to said proximal end of said bait dispensing head;
said wire coupled to said piston assembly for controlling extension and retraction of said piston assembly in relation to said bait dispensing head;
wherein the activator assembly is configured such that translation of said wire distally within said flexible sleeve moves said piston assembly from the retracted position to the extended position.

15. A rodent bait dispenser as recited in claim 14:
wherein in the retracted position the piston assembly is retracted in relation to the bait dispensing head to retain bait in the bait dispensing head between the plunger and the end cap; and
wherein in the extended position the piston assembly is extended from the bait dispensing head for dispensing bait by movement of the bait moving piston.

16. A rodent bait dispenser, comprising:
a bait dispensing head comprising a bait chamber that is substantially closed at a proximal end of the bait dispensing head and open at a distal end of the bait dispensing head;
a piston assembly slidably disposed in said bait dispensing head;
said piston assembly having an extended position and a retracted position with respect to said bait dispensing head;
wherein said piston assembly is configured to slideably translate along said bait chamber from the retracted position to the extended position;
wherein, in the retracted position, the piston assembly is oriented at a location that encloses said open distal end of the bait dispensing head;
wherein, in the extended position, at least a portion of the piston assembly is oriented distally away from the bait dispensing head to expose said bait chamber; and
an activator assembly coupled to said bait dispensing head and said piston;
wherein said activator assembly is configured to extend and retract said piston assembly in relation to said bait dispensing head;
wherein said piston assembly comprises first and second spaced apart piston members;
wherein said first piston member comprises a plunger; and
wherein said second piston member comprises an end cap.

17. A rodent bait dispenser as recited in claim 16:
wherein in the retracted position the piston assembly is retracted in relation to the bait dispensing head to retain bait in the bait dispensing head between the plunger and the end cap; and
wherein in the extended position the piston assembly is extended from the bait dispensing head for dispensing bait by movement of the plunger.

18. A rodent bait dispenser, comprising:
a bait dispensing head comprising a bait chamber that is substantially closed at a proximal end of the bait dispensing head and open at a distal end of the bait dispensing head;
a piston assembly slidably disposed in said bait dispensing head;

said piston assembly having an extended position and a retracted position with respect to said bait dispensing head;

wherein said piston assembly is configured to slideably translate along said bait chamber from the retracted position to the extended position;

wherein, in the retracted position, the piston assembly is oriented at a location that encloses said open distal end of the bait dispensing head;

wherein, in the extended position, at least a portion of the piston assembly is oriented distally away from the bait dispensing head to expose said bait chamber; and an activator assembly coupled to said bait dispensing head and said piston;

wherein said activator assembly is configured to extend and retract said piston assembly in relation to said bait dispensing head;

wherein said activator assembly comprises a handle, and a wire generally enclosed by a flexible sleeve, said wire coupled to said piston assembly for controlling extension and retraction of said piston assembly in relation to said bait dispensing head.

* * * * *